United States Patent [19]

Hashimoto et al.

[11] 4,322,154

[45] Mar. 30, 1982

[54] MOUNTING MECHANISM FOR THE INTERCHANGEABLE LENS ASSEMBLY OF A CAMERA

[75] Inventors: Shigeru Hashimoto, Yokohama; Akiyasu Sumi, Kawasaki, both of Japan

[73] Assignee: Canon Kabushiki Kaisha, Tokyo, Japan

[21] Appl. No.: 241,139

[22] Filed: Mar. 6, 1981

[30] Foreign Application Priority Data

Mar. 10, 1980 [JP] Japan ................................. 55-30072

[51] Int. Cl.³ .......................... G03B 17/00; G03B 7/02
[52] U.S. Cl. ..................................... 354/286; 350/257
[58] Field of Search ................. 354/286; 350/255, 257

[56] References Cited

U.S. PATENT DOCUMENTS

| | | | |
|---|---|---|---|
| 3,906,534 | 9/1975 | Shirasaki | 354/286 |
| 3,914,026 | 10/1975 | Kanno | 350/255 |
| 4,003,068 | 1/1977 | Hashimoto et al. | 354/286 |
| 4,053,211 | 10/1977 | Momiyama | 350/255 |

*Primary Examiner*—Donald A. Griffin
*Attorney, Agent, or Firm*—Toren, McGeady & Stanger

[57] ABSTRACT

A camera lens assembly adapted to be attached in operative engagement with a camera by rotative coupling therebetween including components, such as an aperture signal transmission member and a diaphragm actuating member, which may be retracted away from the camera during attachment operation, with these components being returned to a position in effective cooperative engagement with complementary control members in the camera after attachment of the lens assembly on the camera.

23 Claims, 11 Drawing Figures

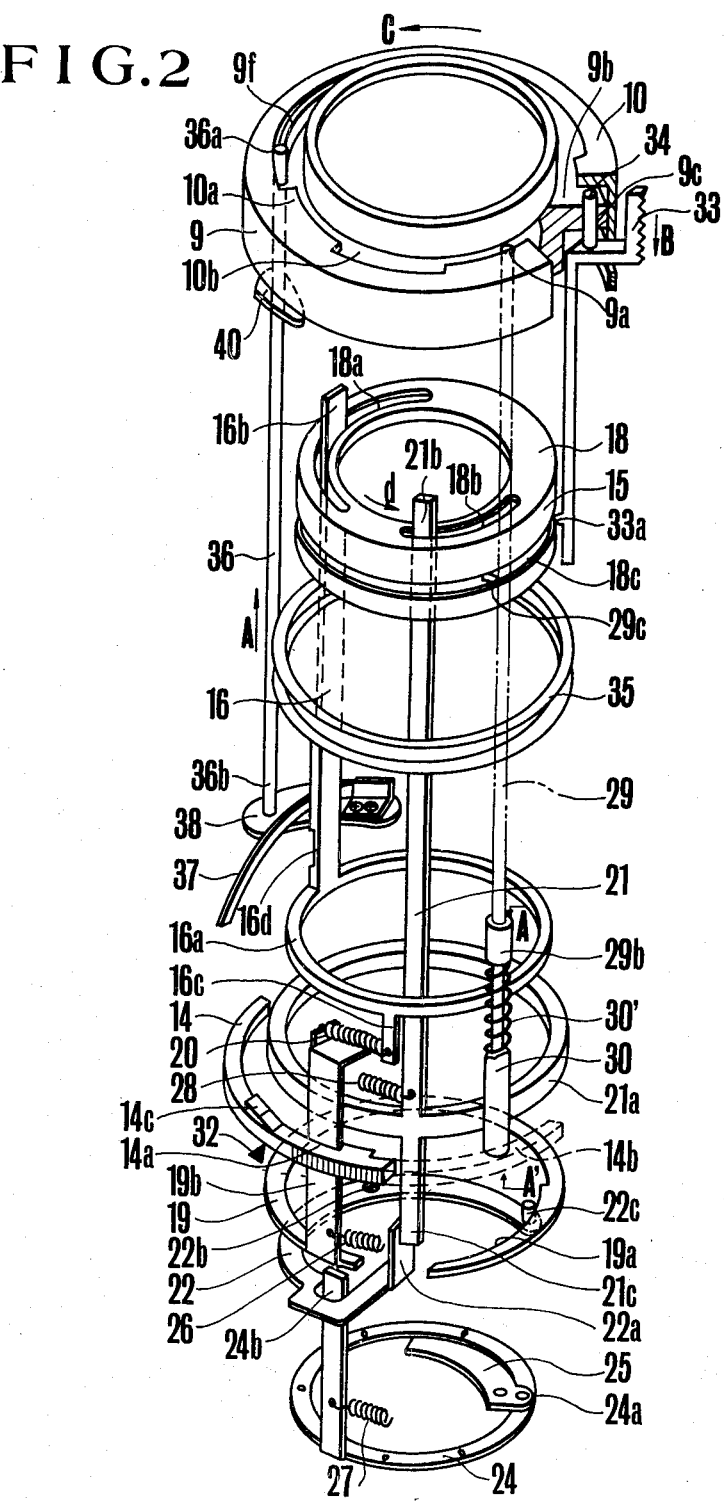

MOUNTING MECHANISM FOR THE INTERCHANGEABLE LENS ASSEMBLY OF A CAMERA

The present invention relates generally to mechanical mounting systems for accessories such as interchangeable camera lenses and other optical instuments and the invention is more particularly directed to a mounting device for accessories such as an interchangeable lens assembly which include means for transmitting exposure signals between a diaphragm device incorporated in the accessory or interchangeable lens unit and cooperating members located in the camera to effect exposure control operation.

In the prior art, mechanical mounting systems have been provided for a camera objective lens having an exposure signal transmitting member or a diaphragm actuating member which may also serve as a transmitting member, the members being operable in a circular path around the center of the optical axis and being located adjacent a screw-type or bayonet-type coupling mechanism. Conventionally, known lens mounting mechanisms have been designed so that when the lens assembly is attached to the camera, the aperture signal transmitting member and the diaphragm actuating member will extend from the lens assembly to the camera in order to engage corresponding cooperating members in the camera. As a result, attachment operation of the lens assembly to the camera may result in damage to the aperture signal transmitting member and the diaphragm actuating member if engagement of these members with their cooperating members in the camera is effected with the members misaligned. Bending or deformation of the aforementioned control members will operate to produce deleterious effects on the exposure control operation of the camera and the lens assembly.

In such devices, it is necessary to effect exposure control of the camera or of the optical instrument in various operating modes. Thus, it is necessary to establish an operative connection between components in the lens assembly and an exposure control mechanism in the camera. It is known to provide the lens assembly with components such as the aperture signal transmitting member cooperating with a diaphragm setting ring in the lens assembly and engageable with an aperture signal transmitting member in the camera. Furthermore, an actuating member for actuating the diaphragm presetting mechanism in the lens assembly is provided which operates in response to a release actuation of the camera. The engaging relationship between the lens mounting mechanism which must include the aforementioned two operating members, i.e., the aperture signal transmitting member and the diaphragm actuating member, and components in the camera to which the lens is attached causes the mounting mechanism to be complicated since the direction of rotation of the coupling means between the camera and the lens assembly as they rotate about the optical axis during attachment is related to the direction of movement during actuation of the aforementioned signal transmitting member and actuating member. Thus, it becomes difficult to achieve good accuracy with regard to the operative interrelationship between operative components in the lens assembly and cooperating members in the camera when these members must be cooperatively brought together during attachment of the lens assembly on the camera.

It will be found that as the number of operative members necessary to effect exposure control between the lens assembly and the camera increases, the difficulties of performance increase particularly because of the necessity for rotating the lens assembly about the optical axis while at the same time bringing the various operating members into cooperative corresponding engagement with each other between the lens assembly and the camera.

Thus, the present invention is directed toward a mounting mechanism for a lens assembly having a generally simplified structure which will avoid loss in the accuracy of signal transmission between a lens assembly and a camera when they are mounted together in operative relationship.

The invention is further directed toward the provision of a mechanism which will assure the establishment of an accurate cooperative relationship between operating members in the lens assembly and cooperating members in the camera even when a plurality of such members must be provided.

The invention seeks to accomplish the aforementioned results by providing a mechanism for the signal members on the lens side operating in such a manner that when the lens is being attached with the camera, the operative members in the lens assembly may be axially retracted from the camera and so that they may be allowed to return to their initial positions to project into engagement with signal members in the camera after bayonet coupling is completed.

The mechanism of the present invention operates so that the lens will be prevented from being accidentally disconnected from the camera and there is thus avoided the need for a separate lens locking device. In the case of a lens assembly having incorporated therein a diaphragm and a diaphragm presetting mechanism, it is usually necessary to transmit a signal which is representative of a selected mode of operation either in the manual mode or the automatic mode, which signal must be introduced into the camera. With the present invention, a member of this type is positioned in a space provided in part of the bayonet coupling arrangement and it will retract from the exposed surface of the bayonet ring when attaching the lens assembly.

Furthermore, the invention is arranged so that there may be provided holding means for holding the signal transmission member at a predetermined position when the lens barrel means is dismounted from the camera so that a positional association with a cooperating member in the camera may be easily established each time that the lens assembly is mounted on the camera.

SUMMARY OF THE INVENTION

Briefly, the present invention may be described as a camera lens assembly adapted to be attached in operative engagement with a camera by rotative coupling therebetween, the lens assembly including component means such as an aperture signal transmission member and a diaphragm actuating member, which components may be retracted away from the camera during attachment operation, with these components being returned to a position in effective cooperative engagement with complementary control members in the camera after attachment of the lens assembly on the camera.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 2 is an exploded perspective view showing an embodiment of the lens assembly in accordance with the invention and depicting the mounting mechanism with the exclusion of lens components;

DETAILED DESCRIPTION OF THE PREFERRED EMBODIMENT

Figure 1A:
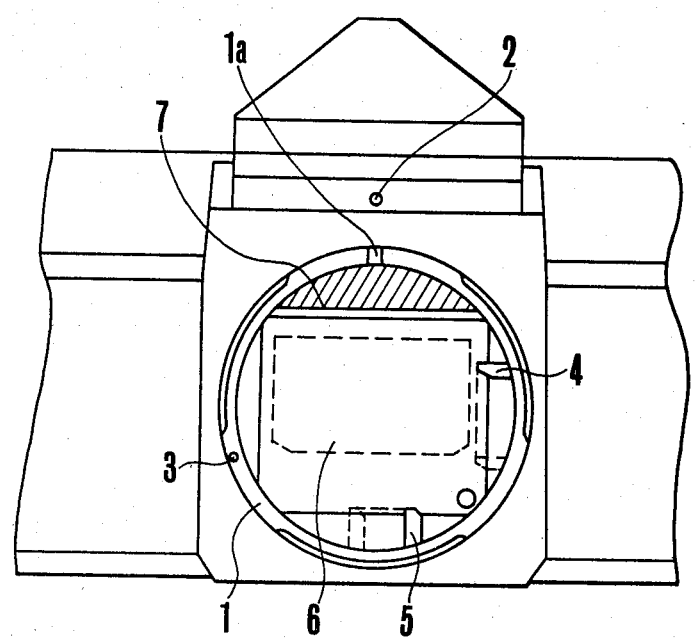
FIG. 1(a) is a front view of a camera with which the lens assembly of the invention may be operatively connected.

Referring now to the drawings, wherein similar reference numerals are used to refer to like parts throughout the various figures thereof, there is shown in FIG. 1(a) a camera of the type to which the lens mounting assembly of the present invention may be attached. The camera is provided with a camera bayonet ring 1 which may be coupled with a bayonet ring 10 on the lens assembly.

The camera is provided with a cutout groove 1a in the bayonet ring 1 which is adapted to engage with a position determining pin 34 in the lens assembly. An index mark 2 is provided on the camera in order to facilitate position adjustment when the lens assembly is attached to the camera. A signal pin 3 operates to receive a signal indicating whether the lens assembly is set in the manual or automatic selection mode in response to changeover operation of the cooperating components in the lens assembly. It will be understood that the lens assembly may be set for operation of the diaphragm mechanism in the manual mode or in the automatic mode and elements in the lens assembly will transmit a selection signal to the interior of the camera.

An aperture signal transmitting member 4 in the camera is adapted to cooperate with an aperture signal transmitting member 16 in the lens assembly whereby a set aperture value may be transmitted from the lens assembly to the camera when the lens assembly is set in the manual diaphragm operating mode. Furthermore, a computed aperture value signal may be transmitted from the camera to the lens assembly when the lens assembly is set in the automatic diaphragm operating mode.

The camera side signal transmitting member 4 is arranged to move from the position indicated in solid line in FIG. 1(a) to the position indicated in dashed line form. A diaphragm actuating member 5 which operates to drive a diaphragm actuating member 21 located in the lens assembly in response to exposure release operation of the camera is arranged to move from the solid line position shown in FIG. 1(a) to the dashed line position depicted. A mirror position 6 is indicated in FIG. 1(a) and a frame portion 7 is arranged so that the free end of the mirror 6 will abut thereagainst when the mirror 6 is retracted from the light path of the camera and is flipped upwardly for exposure actuation.

Figure 1B:
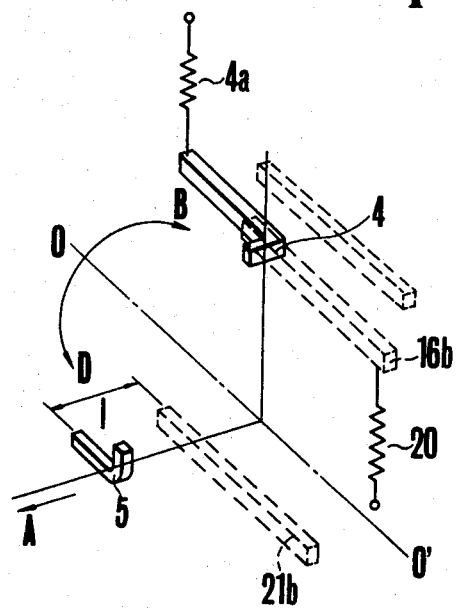
FIGS. 1(b) and 1(c) are schematic diagrams showing relative positioning of cooperating members of the lens assembly and the camera, with FIG. 1(b) showing the situation when the lens is in tightened condition on the camera and with FIG. 1(c) depicting the condition after the lens is attached to the camera.
Figure 1C:
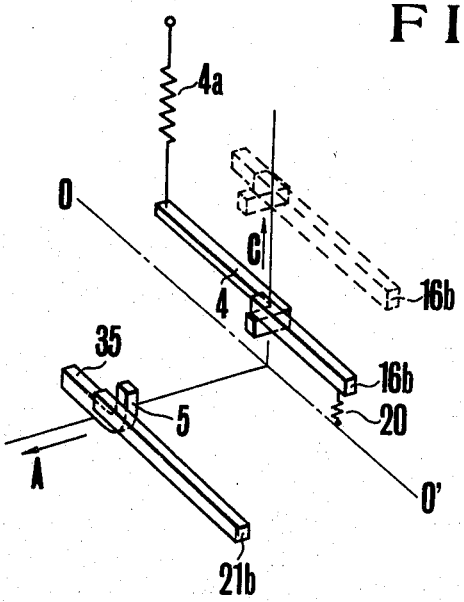
Figure 3:
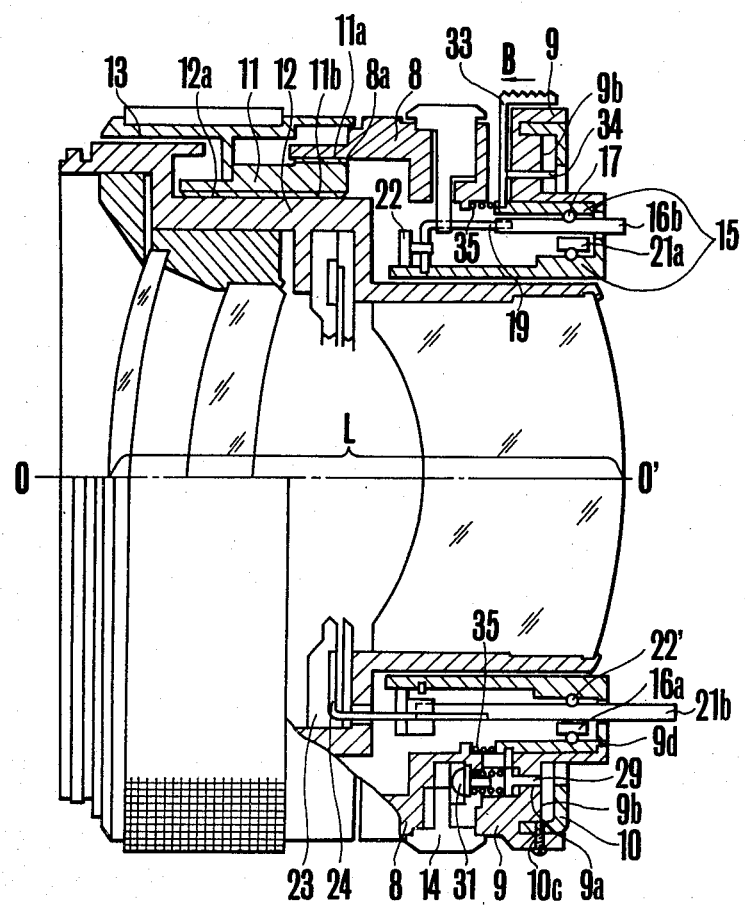
FIG. 3 is a sectional view of a lens assembly of the type depicted in FIG. 2.

When the lens assembly is attached to the camera, the end portions of the signal and actuating members in the lens assembly must be arranged for cooperative relationship with the members 4 and 5 in the camera. In conventional systems, since the lens side operating members must extend a sufficient distance into the camera to be placed in cooperative relationship with the camera side operating members, problems may arise in that rotation of the signal members during rotative movement of the lens for attachment to the camera may cause interference between the lens operating members and parts of the camera such as, for example, the frame 7. Such problems may arise in connection with prior art devices wherein a plurality of signal members move in different directions from each other and wherein each of the camera side and lens side signal members must change position during attachment operation. The relationships between the various operating elements is depicted schematically in FIGS. 1(b) and 1(c). In FIG. 1(b) there is shown the position where the index marks on the lens and on the camera are in registration with each other. FIG. 1(c) shows the position where after the lens is rotated about the optical axis from the position shown in FIG. 1(b), the bayonet coupling or screw coupling will be tightened in order to effect attachment of the lens assembly on the camera. After the lens has been attached to the camera, the camera side control member 5 must engage the lens side transmission member 21, and more particularly an arm 21b of the actuating member 21 in order to drive the actuation member 21 for actuation of a diaphragm mechanism, to be described in more detail hereinafter.

Furthermore, the signal transmitting member 16 in the lens assembly is formed with an arm 16b which must engage with the signal transmitting member 4 in the camera.

Obviously, when the lens assembly is to be mounted on the camera, difficulty can be encountered because of the fact that elements such as the ends of the arms 16b and 21b must be brought into appropriate cooperating relationship with elements such as the members 4 and 5 in the camera. The arrangement must be such that accuracy of signal transmission is not adversely affected and also the mounting mechanism for the lens assembly and the control mechanism should not be overly complicated.

The device of the present invention is depicted in greater detail in FIGS. 2-5. As indicated in FIGS. 2-5, the lens assembly of the invention is provided with a fixed sleeve 8 and a bayonet holder ring 9 which is affixed to the sleeve 8. A bayonet ring 10 is fastened to the front end of the bayonet holder ring 9 by screws 10c, with the ring 10 being provided with pawls 10a and with slots or cutout portions 10b whereby the bayonet ring 10 may be brought into mounting engagement with the bayonet ring 1 on the camera. The bayonet ring 10 is provided with a resilient member such as a spring and slotting means, in a manner known in the art.

An intermediate sleeve 11 is threadedly engaged in fitted relationship with the stationary sleeve 8 by screw threads 8a and 11a and is fitted on a basic sleeve 12 for the lens assembly by a helicoid connection 12a, 11b. The intermediate sleeve 11 is affixed to a focusing ring 13 so that when the focusing ring 13 is rotated, the basic sleeve 12 is moved axially to effect focusing of the lens L. A diaphragm setting ring 14 is fitted in a recessed portion of the stationary sleeve 8 and is arranged to be accessible from outside of the lens assembly.

A mount ring 15 is fitted in the inner diameter of the bayonet holder ring 9. The mount ring 15 is pressed against a flanged surface 9d of the inner sleeve portion of the holder ring 9 by means of a spring 35, with the mount ring 15 being arranged to be axially movable in the inner sleeve portion of the holder ring 9.

The diaphragm aperture signal transmitting member 16 is formed with an annular portion 16a which radially overlaps the mount ring 15. The annular portion 16a is provided with a circumferential groove which is formed therein. Bearing balls 17 are arranged between the mount ring 15 and the circumferential groove in the annular portion 16a in order to rotatably mount the signal transmitting member 16 relative to the mount ring 15 and to axially affix the member 16 for movement along with the ring 15.

The member 16 includes arm portions 16b and 16c which extend axially rearwardly and forwardly thereof, respectively, from the annular portion 16a, with the arm portion 16b extending through an arcuate slot 18a of a rear cover member 18 fixedly mounted on the end portion of the mount ring 15, with the arm 16b projecting outwardly thereof toward the camera.

The arm portion 16c is connected through a spring 20 to a diaphragm preset cam ring 19.

The driving or actuating member 21 includes an annular portion 21a which overlaps the inner sleeve portion of the mount ring 15 and which is smoothly rotatable relative thereto by operation of bearing balls 22' arranged between a circumferential groove provided in the annular portion 21a and the mount ring 15, the actuating member 21 being thereby restrained from axial movement relative to the ring 15.

The actuating member 21 is formed with arm portions 21b and 21c which extend axially rearwardly and forwardly, respectively, from the annular portion 21a, with the arm portion 21b extending through an arcuate slot 18b of the rear cover member 18. The arm 21b projects outwardly from the slot 18b toward the camera. The other arm portion 21c extends toward the front end of the lens assembly and is arranged to be engageable with an axially extending arm 22a of a cam follow lever 22.

A casing 23 of the diaphragm device of the lens assembly is held by projected portions on the inner periphery of the basic sleeve 12 for the lens L. A diaphragm actuating ring 24 is formed with apertures through which pivot pins, such as a pin 24a, of diaphragm blades 25 may extend, the ring 24 having an arm 24b which engages with the cam follower lever 22.

The lever 22 is pivotally mounted on the mount ring 15 through an aperture 22b. A cam follower pin 22c is mounted on one end of the cam follower lever 22 and is arranged to be brought into abutting contact with a cam surface 19a defined on a cam ring 19.

The cam ring 19 is formed with an arm 19b which is biased by a spring 26 into engagement with an inwardly projecting portion 14a of the diaphragm setting ring 14. A spring 27 is tensioned between the arm 24b and the basic sleeve for the lens assembly in order to urge the diaphragm blades in a predetermined direction.

A spring 28 urges the actuating member 21 to its initial position. The spring 28 is connected at its other end with the mount ring 15 and operates to bring the arm 21c into engagement with the extension or arm 22a of the lever 22.

The lens assembly includes a changeover signal transmitting member 29 for transmitting between the lens assembly and the camera information determining whether the manual diaphragm operating mode or the automatic diaphragm operating mode is selected. The changeover member 29 extends through a hole 9a provided in the bayonet ring 9 and is arranged in parallel with the optical axis of the lens assembly. One end of the changeover member 29 projects outwardly from the rear surface of the bayonet holder ring 9, which also serves to define an attachment reference surface 9b engaging the camera. The other end of the member 29 has affixed thereto a pin 31 with the lower end of the member 29 being shown in greater detail in FIG. 5.

As shown therein, the pin 31 is fitted in a hollow sleeve 30 and is biased by a spring 30'.

The hollow sleeve 30 is urged by the spring 30' in a direction so that one end 30a thereof will ride upon an engagement surface 14b formed on the diaphragm setting ring 14. It will be apparent that the diaphragm setting ring 14 may be rotated to select a setting for one of several manual operating mode setting values. Additionally, the ring 14 may be set to the automatic adjustment mode and when the automatic adjustment mode is set on the ring 14 by bringing the appropriate marking thereon in registry with an index 32, a wedge 14c will be moved beneath the changeover member 29 so that the member 29 will be moved upwardly or in a direction toward the camera.

The lens assembly is also provided with an operating button 33 which extends to the exterior of the lens assembly from the sleeve 8, with the button 33 being integrally formed with an axially extending arm located on the inner periphery of the sleeve 8. The operating button 33 is arranged to be axially movable relative to the sleeve 8 and a pin 34 which is fitted in a hole 9c in the bayonet holder ring 9 is arranged to project outwardly from the attachment reference surface 9b toward the camera.

The changeover member 29 and the operating button 33 each are formed with extensions 29c and 33a, respectively, in the elongated portions thereof, with the extensions 29c, 33a engaging in a groove 18c provided in the outer periphery of the sleeve portion of the mount ring 15. As previously indicated, the ring 15 is urged by the coil spring 35 to move toward the camera thereby to abut the flanged portion 9d of the bayonet holder ring 9. The spring 35 is arranged between the mount ring 15 and the stationary sleeve 8.

A lock pin 36 is arranged to extend through an arcuate slot 9f provided in the bayonet holder ring 9, with the pin 36 extending parallel with the optical axis of the lens assembly. One end 36a of the pin 36 projects outwardly beyond the reference surface 9b of the ring 9 with the other end of the pin 36 having a leaf spring 38 which fixedly carries a spring 37, the pin 36 being urged in a direction indicated by the arrow A.

Figure 6A:
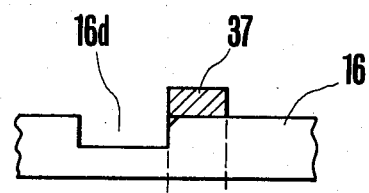
FIGS. 6(a)-6(d) are schematic diagrams depicting the operation of holding means for a lens assembly component.
Figure 6B:
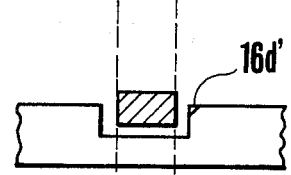
Figure 6C:
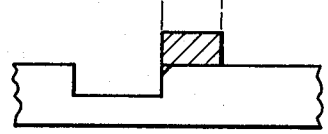
Figure 6D:
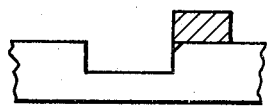

FIGS 6(a), (b), (c), and (d) schematically depict the engaging relationship between the spring 37 and the arm 16b of the signal transmission member 16. FIG. 6(a) shows both of these components at a position where the lens assembly and the camera are brought into alignment whereby the spring 37 is in a frictional engagement with the arm 16b. FIG. 6(b) shows the relationship after mounting of the lens assembly on the camera is completed, wherein the spring 37 drops in a notch 16d on the arm 16b whereby engagement is released. FIG. 6(c) shows the condition in which the operating button 33 is pressed to a direction B for dismounting the lens from the camera, wherein the signal transmission member 16 retracts and the spring 37 comes to a position at which the spring is out of the notch 16d. FIG. 6(d) shows the condition in which the lens is dismounted from the camera and the pressing force is released from the operating button 33, whereby the mount ring 15 as well as each of members 16b, 21b are returned to their respective original positions.

The leaf spring 38 has one end fixed at the fixed barrel 8, and the lock pin is retracted against the resilient power of the spring 38 when the lens is dismounted from the camera, while the lock pin 36 is biased to the direction of the camera by the resilient power of the spring 38 when the lens is mounted on the camera for effecting a locking function between the lens and the camera.

Figure 4:
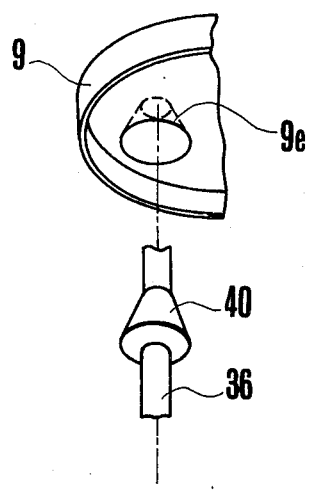
FIG. 4 is a fragmentary perspective view of a latching mechanism of the lens assembly.
Figure 5:
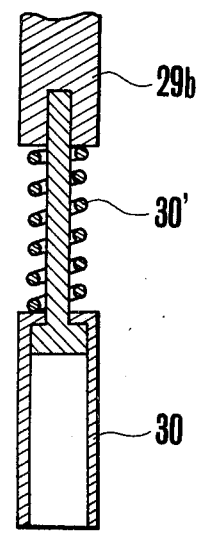
FIG. 5 is a sectional view taken along the line A—A' of FIG. 2.

The lock pin 36 fixedly carries a frustoconical latch member 40, best seen in FIG. 4. The latch member 40 is arranged to fit in a conical recess 9e similarly configured and formed in the flange of the bayonet holder ring 9. The engagement of the lock pin 36 within the arcuate slot 9f, which is concentric with the optical axis, operates to maintain the lock pin 26 at a predetermined position relative to the camera during the time when the lens assembly is being attached to and detached from the camera. The spring 37 will always connect the arm portion 16b of the signal transmitting member 16 at a predetermined position when the lens assembly is detached from the camera. As shown in FIG. 2, with the lens assembly detached from the camera, the lock pin 36 will be urged by the spring 38 in a direction indicated by the arrow A so that the latch member 40 will be engaged in the recess 9e and so that the signal transmitting member 16 will be maintained at the predetermined position by the pressure of the spring 37.

When the lens assembly is to be attached with the camera, the index mark on the lens assembly is first brought into registry with a corresponding or cooperating index on the camera housing. The relative positioning existing between the arm 16b and the spring 37 at this time is depicted in FIG. 6(a). The bayonet ring 10 will be brought into mating engagement with the bayonet ring 1 of the camera body, and the pin 34, the lock pin 36 and the changeover pin 29 (assuming that the lens is set in the automatic mode) will be pressed against the annular reference surface on the camera thereby being urged in a direction away from the reference surface 9b. At the same time, the operating button 33 is also depressed in a direction indicated by the arrow B. As a result, the mount ring 15 will be moved toward the object side of the lens assembly, i.e., away from the camera, thereby urging the signal transmitting member 16, the changeover member 29 and the actuating member 21 in the same direction.

At this time, while a free end of the spring 37 is in a frictional engagement with the arm 16b of the signal transmission member 16, it does not drop into the groove 16d of the arm 16 (FIG. 6(c)). As the head of the lock pin 36a is pressed by the bayonet plane at the camera side, the lock pin 36 moves in a direction contrary to the direction A, and engagement between the locking member 40 and the conical recess 9e is released. Therefore, the spring 38 is placed in a state such that its free end is bent. Since the signal transmission member 16 in this state is in frictional engagement with a free end of the spring 37, it is held at a predetermined position of the mounting member 15.

When the components of the lens assembly are rotated in the direction indicated by the arrow C, tightening engagement of the bayonet coupling members will be effected and the lens assembly will be brought into operative mounted engagement with the camera. At the termination of rotation of the lens components, with the lens assembly mounted in operative position on the camera, the position determining pin 34 will drop into the slot or cutout 1a in the camera side bayonet ring 1 thereby operating to determine the relative angular position of the lens assembly with the camera. As the position determining pin extends into the slot 1a, the mount ring 15 will be driven by the spring 35 to move toward the camera. At the same time, the signal transmitting member 16 and the actuating member 21 will also move toward the camera and will thereby be brought into operative position for engagement with the camera side signal transmitting member 4 and the control or actuating member 5 (see FIG. 1(c)).

As shown in FIG. 2, when the lens assembly is detached from the camera, the signal transmitting member 16 is set in its initial position by the spring 37. Then, when the lens is rotated into tightened engagement with the camera, the lock pin 36 will be axially pressed at its end 36a against the camera side bayonet ring and the other end 36b will be pressed by the spring 38 in the lens mounting. As a result, it is maintained fixed in a certain position relative to the camera. The leaf spring 37 which axially presses the arm 16b of the signal transmitting member continues to exert a pressing action during the time that tightening of the lens assembly is performed. Then, upon completion of the tightening operation by rotation of the stationary sleeve 8, intermediate sleeve 11 and base sleeve 12, as the diaphragm setting ring 14 rotates in the direction indicated by the arrow, the preset cam ring 19 and the signal transmitting member 16 also rotate along the arcuate slot 9f thus setting the camera side signal transmitting member in the position of FIG. 1(c) against the force of a spring 4a. Such movement of the signal transmitting member 16 also causes the leaf spring 37 to drop in the slot or cutout portion 16d of the arm 16b whereby the latching of the signal transmitting member 16 by the leaf spring 37 is released.

As the mount ring 15 is axially retracted when the lens assembly is brought into position relative to the camera, the actuating member 21 will also move axially along with the ring 15. Rotation of the lens barrel means of the lens assembly comprising the stationary sleeve 8, the intermediate sleeve 11 and the basic sleeve 12 in the tightening direction indicated by the arrow C is followed by the actuating member 21. Thus, at the termination of the tightening rotation of the bayonet couplings, as shown in FIG. 1(c), it will be set to be engageable with the camera side control member.

During operation of the lens assembly of the invention, if it is desired to operate the diaphragm in the manual mode, the diaphragm setting ring 4 is rotated to place a desired aperture value in registry with an index 32 while permitting the diaphragm preset cam ring 19 to follow the diaphragm setting ring 14 and to move against the force of the spring 26. Such motion of the diaphragm presetting cam ring 19 causes the signal transmitting member 16 to be placed in a position where its location is dependent upon the set aperture value under the action of the spring 20. This motion of the signal transmitting member 16 will be transmitted to the camera side signal transmitting member 4 and from there to an exposure control mechanism (not shown) in the camera.

Subsequently, when release actuation of the camera is effected, the corresponding member 5 will be driven to move from the position shown in solid line form in FIG. 1(a) to the dashed line position and the actuating member 21 in the lens assembly will also be moved in a direction indicated by the arrow d. Since the arm 22a of the cam follower lever 22 will abut the arm 21c, it will follow the actuating member 21 as it moves in a direction indicated by the arrow d until the pin 22c abuts against the camming surface 19a of the diaphragm preset cam ring 19. Thus, the size of the aperture opening defined by the diaphragm blades 25 will be closed down to the desired setting.

When the lens assembly is used in the automatic mode, the diaphragm setting ring 14 is set to place the automatic mark thereon in registry with the index 32 whereby the sleeve 30 will ride upon the wedge 14c thereby causing the end of the changeover member 29 to project outwardly from the attachment reference surface 9b thereby abutting against the camera side signal pin 3. Thus, the exposure control mechanism will be switched to the automatic exposure mode and when the camera is released the corresponding member 5 will be driven to actuate the diaphragm mechanism. Since the camera side signal transmitting member 4 takes a position dependent upon the exposure value computed by the exposure control mechanism in the camera along with the signal transmitting member 16, such motion of the signal transmitting member 16 is transmitted through the spring 26 to move the diaphragm preset cam ring 19 thereby presetting the diaphragm mechanism. Motion of the actuating member 21 will move the cam follower lever 22 and the diaphragm actuating ring 24 whereby the diaphragm blades 25 will be closed down to the desired aperture value.

When the lens assembly is to be detached from the camera, the operating button 33 is first depressed in a direction indicated by the arrow B whereby the mount ring 15 is axially moved in the direction of the arrow B and whereby the signal transmitting member 16, the actuating member 21, the position determining pin 34, and the changeover member 29 will all be retracted into the interior of the lens assembly.

The positional relationship at this time changes from that shown in FIG. 6(b) to that shown in FIG. 6(c). That is, the arm 16b retracts as a tapered plane 16d' at a corner edge of the slot 16d and the spring 37 come in contact with each other, and the spring 37 frictionally engages with the arm 16b.

With the lens assembly in this condition, when the components of the lens assembly are rotated in a direction detaching the lens assembly from the camera, i.e., in a direction opposite to the tightening direction, the bayonet coupling members on the lens assembly and on the camera will be disconnected so that the lens assembly may be removed from the camera. During the time when the bayonet holder ring 9 is rotated, the lock pin 36 is fixed in a predetermined position within the hole formed in the bayonet holder ring 9 and the spring 37 on the lower end of the lock pin 36 is taken out of the slot or cutout portion 16d as the signal transmitting member is depressed. The spring 37 will, in turn, apply pressure acting on the arm 16b thereby holding the signal transmitting member 16 in the predetermined position of the mount ring 15.

Since the signal transmission member 16 returns to its original position when the lens assembly is dismounted from the camera, the position of FIG. 6(d) is established, and the member 16 held at a predetermined position of the mounting ring by the frictional engagement with the spring 37.

Of course, the position of the signal transmission member 16 will be different depending on the position at which the diaphragm aperture setting ring 14 of the lens is set, for example, at the fully opened diaphragm aperture value F 1.4 and at the small diaphragm aperture value F 32. However, the signal transmission member can be retained in proper position by providing the free end of the spring 37 with a shape bent along the rotating locus of the arm 16b in a state when the lens is removed from the camera.

In the detaching operation of the lens assembly from the camera as described above, when the angle of rotation of the lens mounting system for decoupling of the bayonet members differs from that of the return of the signal transmitting member 16 and the actuating member 21 to the predetermined position, there is provided compensating means for canceling this angle difference to assure return of the various signal members 16 and 21 to the predetermined positions.

When the lens barrel is rotated in a reverse direction from that indicated by the arrow C to decouple the bayonets, the signal transmitting member 16 and the actuating member 21 are rotated in the direction opposite to that indicated by the arrow d.

The aforementioned members 16 and 21 are stopped at the predetermined positions by rotation of stopping means (not shown) provided in the lens barrel.

When the angle of rotation of the members 16 and 21 to the predetermined positions is smaller than that of the rotation of the bayonet coupling members to the uncoupled position, the resultant angular difference is compensated by the spring members 20, 28, and 26.

As will be apparent from the foregoing, the present invention is particularly applicable in a lens assembly of the type having a member such as the member 16 for transmitting an exposure control signal between the lens assembly and the camera and including an actuating member such as the member 21 for transmitting an actuating signal from the camera for operation of the diaphragm mechanism. Furthermore, the invention is directed toward a lens assembly which may include a member such as the member 34 for holding the lens in a predetermined position relative to the camera. In such lens assemblies, these members must project outwardly beyond the attachment reference surface of the lens assembly in order to be brought into operative condition relative to the camera. The invention is directed toward a solution of the problem which arises when the attachment of the lens assembly to the camera requires a rotative movement of the lens assembly components to bring the coupling means into the tightened position. Since, in accordance with the present invention, the signal transmitting member 16, the position determining pin 34, and other components of the lens assembly may be axially retracted when the lens is attached to and detached from the camera, the complexity of the structure of the mechanism in the lens barrel may be reduced and the accuracy of adjustment of the lens component members relative to the corresponding members in the camera may be maintained at a high level.

Furthermore, in the case of the present invention, exposure operation of the camera with the lens assembly may be effected by mechanical means such as the diaphragm preset mechanism which comprises the signal transmitting member 16, the diaphragm preset cam ring 19, springs 20 and 26 and the like, and the diaphragm mechanism which comprises the cam follower lever 22, the diaphragm actuating ring 24, the blades 25, and the spring 27.

Furthermore, it will be seen that the invention may also be applicable in newly developed electromagnetically operated aperture control systems. In such a system, the exposure control signal generated in the lens assembly or in the camera takes the form of an electrical signal. The present invention may be applied with great advantage to a lens assembly of this type which has signal terminals for transmitting the electrical signals. That is, in the case of an electrical signal terminal, it is required that the terminals on the lens side and on the camera side be arranged in opposition to each other while avoiding wear thereof as the terminals contact each other.

In the case of the present invention, for example, the mount ring 15 may be selected to carry the electrical signal terminals whereby the drawbacks mentioned above may be overcome. Furthermore, though the present invention has been described in connection with an embodiment wherein the diaphragm control mechanism comprises a plurality of members including the signal transmitting member 16 and the actuating member 21, it is of course possible to apply the present invention in situations where both members are combined into a single member.

While a specific embodiment of the invention has been shown and described in detail to illustrate the application of the inventive principles, it will be understood that the invention may be embodied otherwise without departing from such principles.

What is claimed is:

1. An accessory mounting device for optical equipment comprising:
   (a) first component means having coupling means arranged to engage with complementary coupling means of said optical equipment for mounting said accessory mounting device on said optical equipment;
   (b) second component means slidable relative to said first component means, said second component means being arranged to be maintained in a predetermined positional relationship relative to said first component means when said accessory mounting device is mounted on said optical equipment;
   (c) light defining means for controlling light entering through said accessory mounting device; and
   (d) transmission means for transmitting an exposure control signal between said accessory mounting device and said optical equipment, said transmission means being mounted with said second component means for movement in the axial direction together with said second component means.

2. An accessory mounting device according to claim 1 further comprising bias means for biasing said second component means in the axial direction and for positioning said second component means into predetermined position relative to said first component means.

3. An accessory mounting device according to claim 1 further comprising operation means for moving said transmission means in the direction of the optical axis when said accessory mounting device is mounted on said optical equipment, said coupling means and said complementary coupling means being thereby brought into coupled engagement.

4. An accessory mounting device according to claim 3 further comprising driving force transmission means for transmitting a driving force to said light defining means, said driving force transmission means being mounted on said second component means, said driving force transmission means being arranged to be movable in the direction of the optical axis by said operation means.

5. An interchangeable lens assembly for a camera comprising:
   (a) lens barrel means including lens means for forming an image of an object to be photographed;
   (b) mounting means arranged to slide within said lens barrel means and being biased for movement in the axial direction thereof;
   (c) coupling means fixed on said lens barrel means for engaging with complementary coupling means on said camera;
   (d) light defining means for controlling light entering said lens means; and
   (e) transmission means for transmitting exposure control signals between said lens assembly and said camera, said transmission means being movable in the direction of the optical axis of said lens assembly together with said mounting means when said lens assembly is dismounted from said camera.

6. An interchangeable lens assembly for a camera comprising:
   (a) lens barrel means having lens means for forming an image of an object to be photographed and coupling means for engaging with complementary coupling means on said camera;
   (b) mounting means mounted on said lens barrel means in rotatable relationship therewith and having a reference surface for engaging with said camera;
   (c) light defining means for controlling light entering through said lens means; and
   (d) transmission means for transmitting an exposure control signal between said lens assembly and said camera, said transmission means having a portion extending to said camera with said transmission means being biased toward said camera, said extending portion of said transmission means being moved in the axial direction when said lens assembly is dismounted from said camera.

7. An interchangeable lens assembly according to claim 5 or 6 further comprising operation means for moving said transmission means in the axial direction when said interchangeable lens assembly is dismounted from said camera.

8. An interchangeable lens assembly according to claim 7 further comprising retainer means adapted to cooperate with complementary retainer means on said camera for holding said mounting means fixed relative to said lens barrel means.

9. An interchangeable lens assembly according to claim 8 further comprising driving force transmission means for transmitting a driving force between said interchangeable lens assembly and said camera, said driving force transmission means operating to actuate said light defining means, and lens locking means having a lock member movably arranged within said lens assembly, said lens locking means operating to prohibit relative rotation of said lens assembly when said lens barrel means is mounted on said camera.

10. An interchangeable lens assembly according to claim 9 wherein said lens locking means is arranged to be engaged with said driving force transmission means, and wherein said driving force transmission means is arranged to be moved together with said mounting means.

11. An interchangeable lens assembly according to claim 5 or 6 further comprising compensating means for compensating the difference between the motion of said lens barrel means and the motion of said transmission means, said compensating means being arranged to engage with said transmission means when said lens assembly is detached from said camera, said transmission means being thereby moved to a predetermined position of said mounting means.

12. An interchangeable lens assembly according to claim 11 further comprising diaphragm setting means rotatably mounted on said lens barrel means and operatively connected with said light defining means, and diaphragm mode changeover means responsive to said diaphragm setting means for transmitting a selected one of a manual exposure mode and an automatic exposure mode to said camera, said diaphragm mode changeover means having changeover signal transmission means connected with said mounting means, said changeover signal transmission means being thereby moved in the axial direction when said lens assembly is mounted or dismounted on or from said camera.

13. An interchangeable lens assembly for a camera comprising:
   (a) lens barrel means having lens means for forming an image of an object to be photographed;
   (b) mounting means arranged to slide within said lens barrel means and having an abutment surface for engaging with the body of said camera;
   (c) coupling means fixed on said lens barrel means for engaging with complementary coupling means on said camera;
   (d) light defining means for controlling light engering through said lens means;
   (e) transmission means for transmitting exposure control signals between said lens assembly and said camera, said transmission means being mounted on said mounting means;
   (f) driving force transmission means for transmitting a driving force between said lens assembly and said camera, said driving force transmission means being mounted on said mounting means; and
   (g) operation means for moving said mounting means in the direction of the optical axis of said lens assembly, said transmission means and said driving force transmission means thereby sliding within said lens barrel means to enable a coupling operation to be effected between said lens assembly and said camera.

14. An interchangeable lens assembly according to claim 13 further comprising diaphragm setting means rotatably mounted on said lens barrel means and operatively connected with said light defining means, and exposure mode changeover means responsive to said diaphragm setting means for transmitting a selected one of a manual exposure mode signal and an automatic exposure mode signal to said camera, said exposure mode changeover means having changeover signal transmission means connected with said mounting means, said changeover signal transmission means being directly or indirectly connected with said operation means thereby to effect movement of said changeover signal transmission means in the direction of the optical axis of said lens assembly.

15. An interchangeable lens assembly according to claim 14 further comprising lens locking means for effecting locking engagement between said lens barrel means and said mounting means, said lens locking means being directly or indirectly connected with said operation means, said lens locking means being thereby moved from said abutment surface of said mounting means by said operation means.

16. An interchangeable lens assembly for a camera comprising:
   (a) first component means having coupling means arranged to engage with complementary coupling means on said camera for mounting said lens assembly on said camera;
   (b) second component means slidable relative to said first component means, said second component means being arranged to be maintained in a predetermined positional relationship relative to said first component means when said lens assembly is mounted on said camera;
   (c) light defining means for controlling light entering through said lens assembly; and
   (d) driving force transmission means for driving said light defining means, said driving force transmission means being slidable in the direction of the optical axis of said lens assembly when said lens assembly is dismounted from said camera.

17. An interchangeable lens assembly for a camera comprising:
   (a) first component means having coupling means arranged to engage with complementary coupling means on said camera for mounting said lens assembly on said camera;
   (b) second component means arranged to slide within said first component means and biased in the direction of the optical axis of said lens assembly;
   (c) light defining means for controlling light entering through said lens assembly; and
   (d) driving force transmission means for driving said light defining means, said driving force transmission means being mounted on said second component means and being moved in the direction of said optical axis together with said second component means when said lens assembly is dismounted from said camera.

18. An interchangeable lens assembly according to claim 17 further comprising bias means for biasing said second component means in the direction of the optical axis and for positioning said second component means in a predetermined position relative to said first component means.

19. An interchangeable lens assembly according to claim 18 further comprising retainer means adapted to cooperate with complementary retainer means on said camera for holding said second component means fixed relative to said first component means, and operating means for moving said driving force transmission means and said retainer means in the direction of the optical axis together with said second component means when said lens assembly is dismounted from said camera.

20. An interchangeable lens assembly for a camera comprising:

lens barrel means including coupling means adapted to engage with complementary coupling means on said camera upon rotation of said lens barrel means for mounting and dismounting said lens assembly and said camera;

exposure control means including parts adapted to extend from said lens assembly to said camera into operative relationship with cooperating components thereof and to be moved relative to said camera when said lens barrel means is rotated to effect mounting and dismounting of said lens assembly and said camera; and means for axially moving said parts of said exposure control means relative to the optical axis of said lens assembly during rotation of said lens barrel means to avoid interference between parts in said camera and said parts of said exposure control means during mounting and dismounting of said lens assembly and said camera to enable said exposure control means to be brought into and removed from operative position relative to said cooperating components in said camera.

21. A lens assembly according to claim 20 wherein said axially moving means comprise an axially movable ring member having said parts of said exposure control means rotatively mounted thereon and axially fixed relative thereto, means for axially moving said ring member in one direction during mounting and dismounting of said lens assembly and said camera and means for moving said ring member in a direction opposite said one direction when said lens assembly is operatively mounted with said camera.

22. A lens assembly according to claim 21 wherein said means for axially moving said ring member in said one direction comprise a manually operable button and a pin, said pin operating to hold said ring member in position after movement in said one direction during mounting and dismounting of said lens assembly and said camera, said pin being arranged to engage a cooperating recess in said camera for permitting said ring member to move in said opposite direction when said lens assembly is mounted on said camera.

23. Apparatus according to claim 22 wherein said means for moving said ring member in said opposite direction comprises a spring member biasing said ring member for movement axially of said lens assembly in a direction toward said camera.

* * * * *